(12) United States Patent
Lin

(10) Patent No.: US 9,038,137 B2
(45) Date of Patent: May 19, 2015

(54) SUBSCRIBER AUTHENTICATION USING A USER DEVICE-GENERATED SECURITY CODE

(75) Inventor: Zhijian Lin, Dublin, CA (US)

(73) Assignee: Cellco Partnership, Basking Ridge, NJ (US)

( * ) Notice: Subject to any disclaimer, the term of this patent is extended or adjusted under 35 U.S.C. 154(b) by 463 days.

(21) Appl. No.: 13/536,336

(22) Filed: Jun. 28, 2012

(65) Prior Publication Data

US 2014/0007196 A1  Jan. 2, 2014

(51) Int. Cl.
*H04L 29/06* (2006.01)
*G06F 21/31* (2013.01)
*H04W 12/06* (2009.01)

(52) U.S. Cl.
CPC .......... *H04L 63/0876* (2013.01); *H04L 63/083* (2013.01); *G06F 21/31* (2013.01); *G06F 21/313* (2013.01); *H04L 63/18* (2013.01); *H04W 12/06* (2013.01)

(58) Field of Classification Search
CPC .......................... H04L 63/083; H04L 63/0876

USPC ......................................................... 726/4, 6
See application file for complete search history.

(56) References Cited

U.S. PATENT DOCUMENTS

| | | | |
|---|---|---|---|
| 2006/0294387 A1 * | 12/2006 | McCracken et al. .......... | 713/182 |
| 2009/0172402 A1 * | 7/2009 | Tran .............................. | 713/170 |
| 2009/0205036 A1 * | 8/2009 | Slaton et al. .................. | 726/9 |

\* cited by examiner

*Primary Examiner* — Jeffrey Pwu
*Assistant Examiner* — Thong Truong

(57) ABSTRACT

A device receives an indication that a security code is to be generated; generates the security code based on the indication; generate a message that includes the security code and an identifier associated with a subscriber of the device; outputs the message using the first protocol; encodes the security code based on outputting the message; and outputs a request to access the service. The request is outputted using a second protocol, and includes the encoded security code and the identifier. The device receives a notification that indicates whether the subscriber is authenticated based on the identifier, the security code, and the encoded security code; and accesses the service when the notification indicates that the subscriber is authenticated.

20 Claims, 9 Drawing Sheets

SUBSCRIBER AUTHENTICATION USING A USER DEVICE-GENERATED SECURITY CODE

BACKGROUND

User devices perform an increasing variety of tasks that allow users to make and receive calls and/or access services (e.g., to send and receive messages, download and play audio and/or video content, make electronic purchases, communicate via social networking, etc.) via a network, such as the Internet. The user devices usually provide, to the network, login credentials (e.g., usernames, passwords, personal identification numbers (PINs), etc.), associated with the users, that enable the users to be authenticated prior to being granted access to the services.

DETAILED DESCRIPTION OF PREFERRED EMBODIMENTS

The following detailed description refers to the accompanying drawings. The same reference numbers in different drawings may identify the same or similar elements.

Systems and/or methods, described herein, may enable a server device, such as an application server, to authenticate a subscriber based on an identifier associated with the subscriber and/or a security code (e.g., that includes a string of characters, numbers, etc.) that is generated by a user device. The systems and/or methods may enable the user device to generate the security code and to provide the security code and the identifier to the application server via an out-of-band message. The out-of-band message may be provided based on a message protocol (e.g., a short message service (SMS) mobile originating (MO) message protocol, a signal system seven (SS7) protocol, an instant message protocol, and/or some other message protocol). The user device may also, or alternatively, provide a request for the service (e.g., a hypertext transfer protocol (HTTP) request, a short message peer-to-peer (SMPP) request, a session initiation protocol (SIP) request, etc.), to the application server, that includes an encoded version of the security code and/or the identifier. Providing the security code, to the application server, via the out-of-band message and the encoded version via the request, may enable the application server to authenticate the subscriber based on the security code and/or the identifier.

Authenticating the subscriber using a user device-generated security code may enable an application server to authenticate the subscriber without instructing the subscriber to provide login credentials (e.g., a username, a password, a personal identification number (PIN), etc.) which may improve the subscriber experience. Additionally, or alternatively, the user device-generated security code may enable different types of user devices, such as those that do not permit applications to access out-of-band messages (e.g., that include application server-generated security codes) received from an application server (e.g., such as messages based on a SMS mobile terminating (MT) message protocol), to authenticate the subscriber. Additionally, or alternatively, using the encoded version of the security code may not permit applications, installed on the user device, to use the security code in an unauthorized manner, which may improve a level of security associated with the user device-generated security code relative to a security code that is generated be the application server.

Figure 1A:
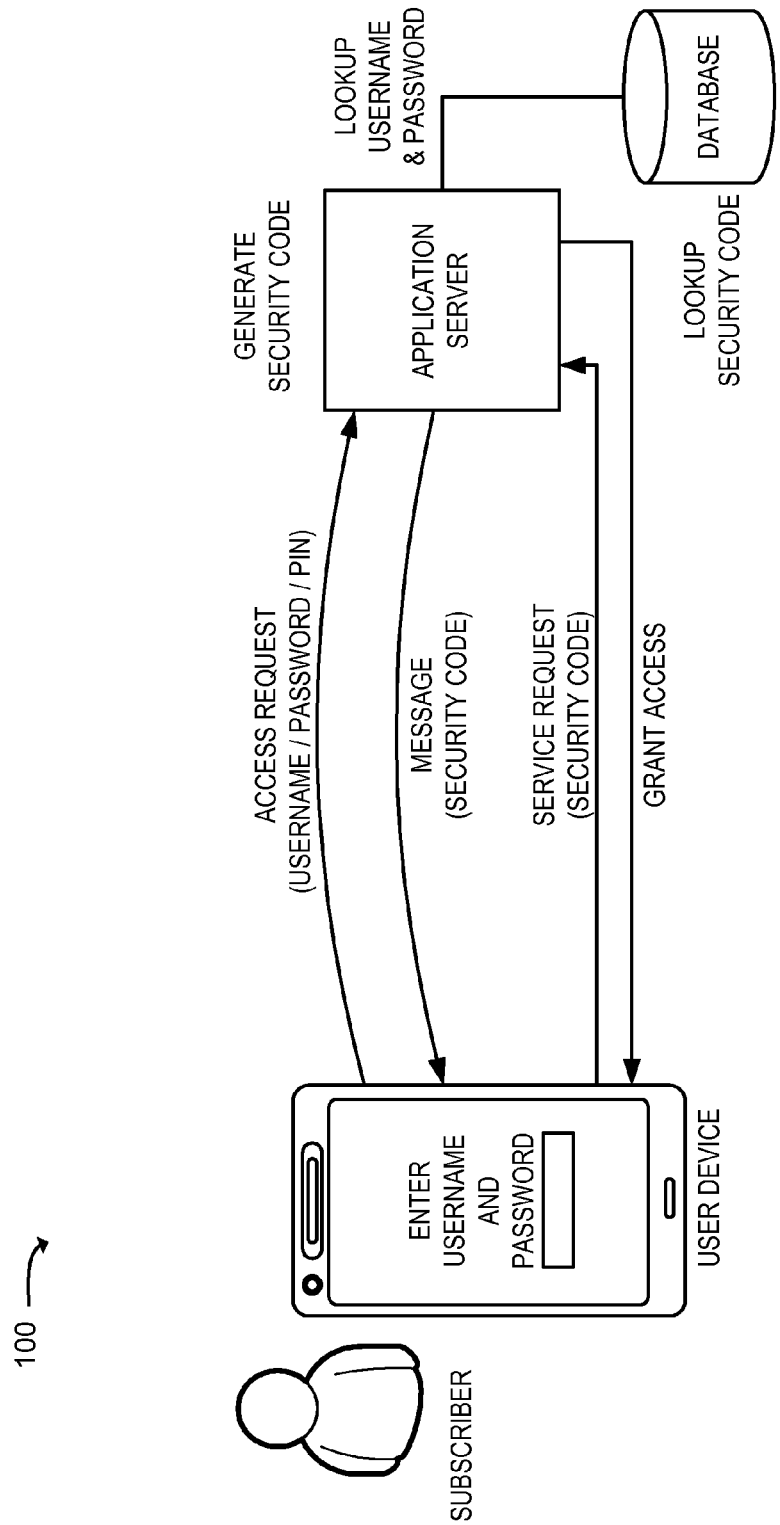
FIG. 1A is a diagram of an example authentication scheme to authenticate a subscriber.

FIG. 1A is a diagram of an example authentication scheme 100 (hereinafter referred to as "scheme 100") to authenticate a subscriber. As illustrated in FIG. 1A, scheme 100 may include a user device associated with a subscriber that desires to obtain a service. The service may, for example, correspond to downloading an application, receiving audio and/or video content, accessing a website, obtaining a document, making an electronic purchase, etc. The subscriber may cause the user device to provide, to an applications server, a request to access the service (e.g., an access request). The request may include subscriber information associated with the subscriber (e.g., a username, a password, a PIN, etc.).

The application server may receive the request and may perform a lookup operation, using the subscriber information, by accessing a database that stores subscriber information associated with the subscriber and/or other subscribers. When the received subscriber information matches subscriber information stored within the database, the application server may, in one example, generate a security code and may store the security code in the database. The application server may provide, to the user device, a message that includes the security code. Additionally, or alternatively, the application server may not generate the security code, but may authenticate the subscriber when the received subscriber information matches the stored subscriber information. In this example, the authentication server may not authenticate the subscriber when the received subscriber information does not match the stored subscriber information.

The user device may receive the message and may provide, to the application server, another request to obtain the service (e.g., a service request that includes the security code). The application server may obtain the security code from the other request and may perform another lookup operation based on the security code. When the received security code matches a security code, stored within the database, the application server may authenticate the subscriber and may provide, to the user device, a notification indicating that the user device has been granted access to the service. When the received security code does not match a stored security code, the application server may not authenticate the subscriber and may provide, to the user device, a notification that indicates that the service cannot be accessed.

Figure 1B:
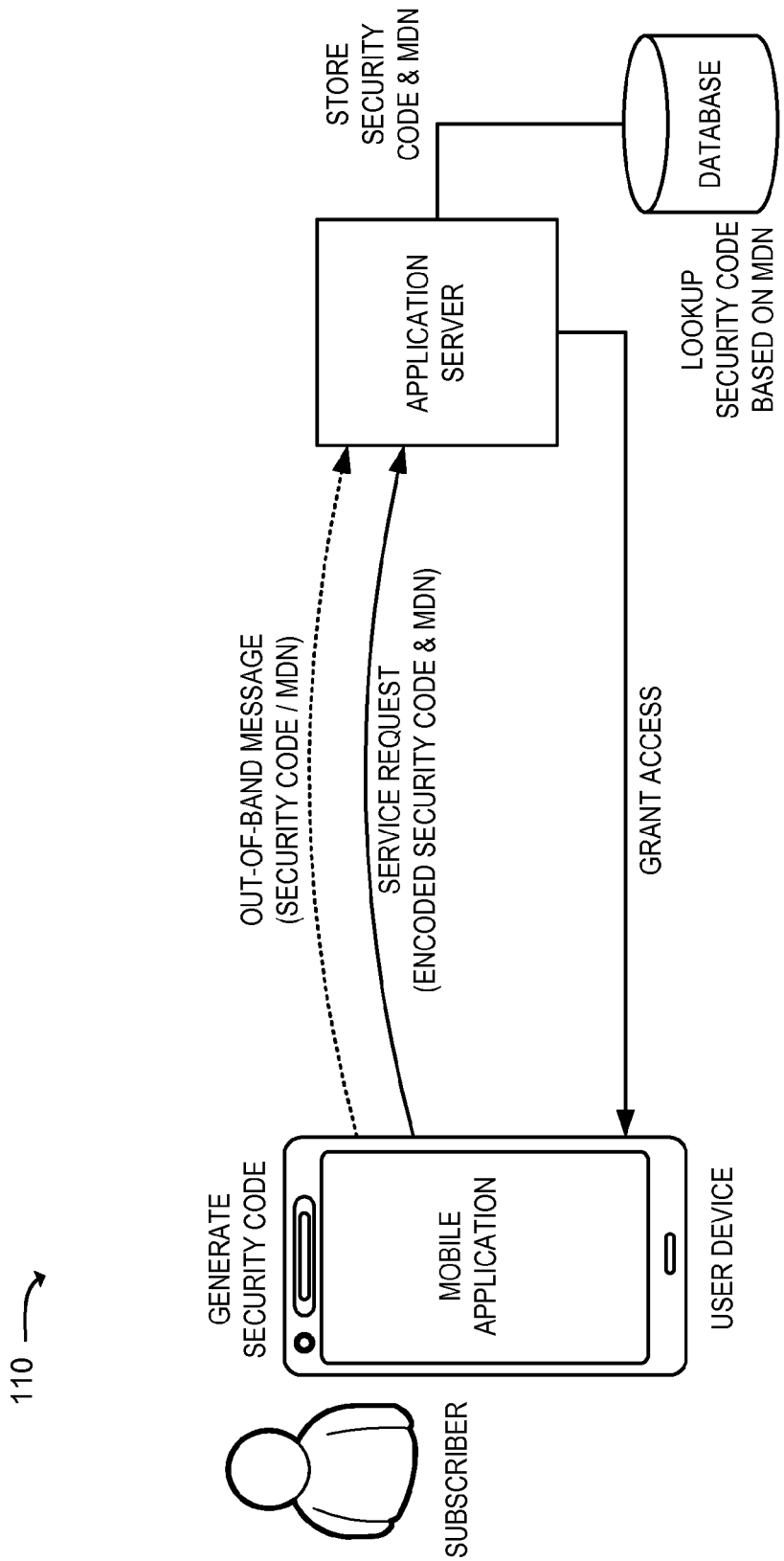
FIG. 1B is a diagram of an overview of an example implementation described herein.

FIG. 1B is a diagram of an overview 110 of an example implementation described herein. As illustrated in FIG. 1B, overview 110 may include a user device associated with a subscriber that desires to obtain a service that is provided by an application server. The subscriber may, for example, instruct the user device to access a service that is provided by the application server. Based on the instruction, the user device may generate a security code and may provide an out-of-band message, that includes the security code and an identifier associated with the subscriber (e.g., a mobile directory number, etc.), to the application server. The out-of-band message may, for example, be based on a particular message protocol (e.g., an instant message protocol, an SMS MO protocol, a SS7 protocol, etc.). The application server may receive the out-of-band message and may store the security code and the identifier in a database.

The user device may also, or alternatively, use a mechanism to encode the security code to create an encoded security code. The user device may provide, to the application server, a request (e.g., an HTTP request, a SMPP request, a SIP request, etc.) to obtain the service that includes the encoded security code and the identifier. The application server may receive the request and may use a decoding mechanism, associated with the identifier, to decode the encoded security code. The application server may determine whether the received identifier matches an identifier stored in the database. When the received identifier matches a stored identifier, the application server may determine whether the decoded security code matches a stored security code associated with the stored identifier. When the decoded security code matches the stored security code, the application server may authenticate the subscriber and may provide, to the user device, a notification indicating that the user device is granted access to the service. When the decoded security code does not match the stored security code, the application server may not authenticate the subscriber and may provide, to the user device, a notification indicating that the service cannot be accessed.

Authenticating the subscriber based on the user device-generated security code may enable the subscriber to be authenticated without providing a username, a password, a PIN, etc. each time a service is accessed, which may improve the user experience. Additionally, or alternatively, authenticating the subscriber based on the user device-generate security code may simplify signaling and/or reduce resource usage compared to authenticating the subscriber based on the username, the password, the PIN, etc.

Figure 2:
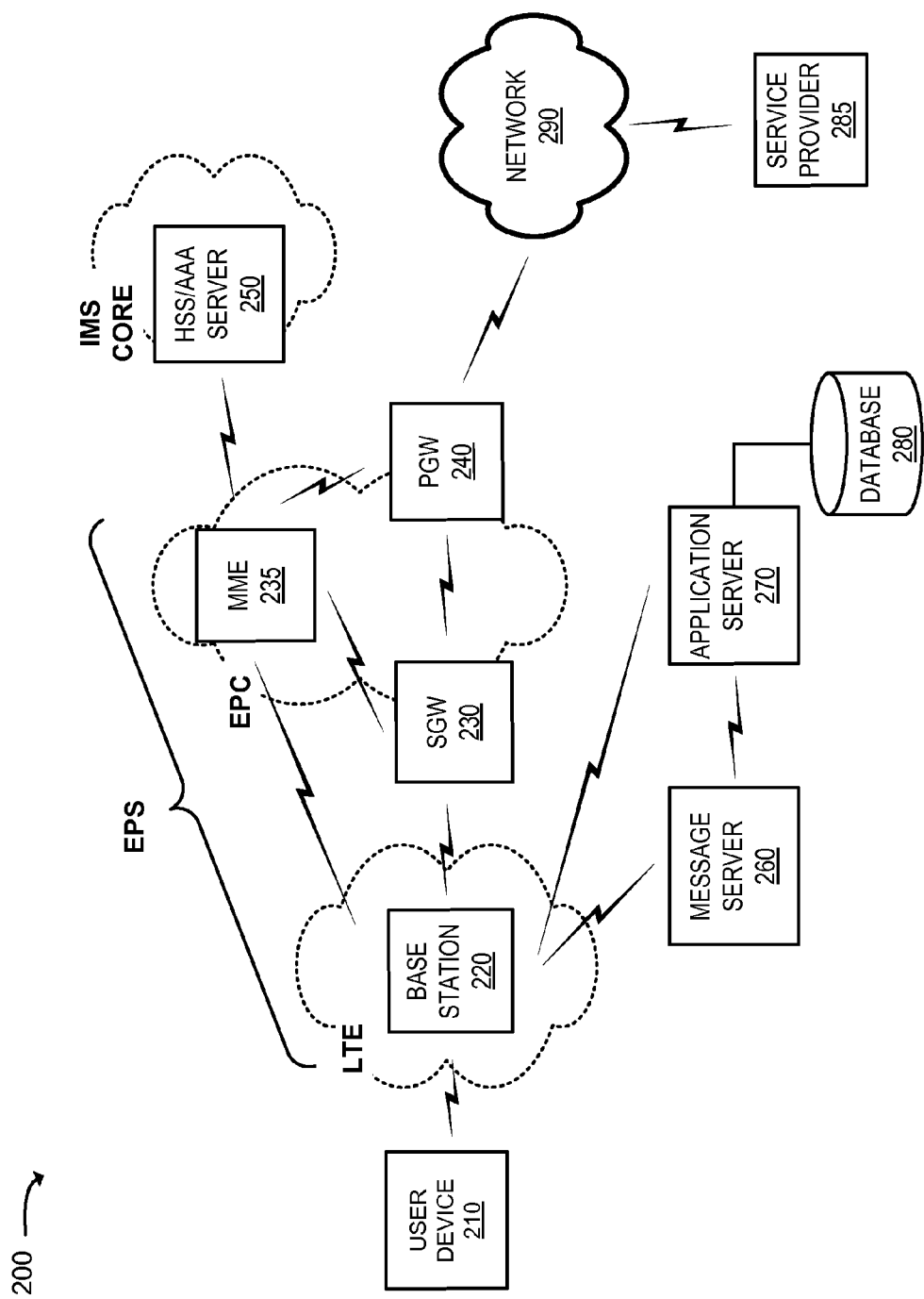
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a base station 220, a serving gateway 230 (hereinafter referred to as "SGW 230"), a mobility management entity device 235 (hereinafter referred to as "MME 235"), a packet data network (PDN) gateway 240 (hereinafter referred to as "PGW 240"), a home subscriber server (HSS)/authentication, authorization, accounting (AAA) server 250 (hereinafter referred to as an "HSS/AAA server 250"), a message server 260, an application server 270, a database 280, a service provider 285, and a network 290.

The quantity of devices and/or networks, illustrated in FIG. 2, is provided for explanatory purposes only. In practice, there may be additional devices and/or networks; fewer devices and/or networks; different devices and/or networks; or differently arranged devices and/or networks than illustrated in FIG. 2. Alternatively, or additionally, one or more of the devices of environment 200 may perform one or more functions described as being performed by another one or more of the devices of environment 200. Devices of environment 200 may interconnect via wired connections, wireless connections, or a combination of wired and wireless connections.

Environment 200 may include an evolved packet system (EPS) that includes a long term evolution (LTE) network and/or an evolved packet core (EPC) network that operate based on a third generation partnership project (3GPP) wireless communication standard. The LTE network may be a radio access network (RAN) that includes one or more base stations 220, some or all of which, take the form of an eNodeB (eNB) via which user device 210 communicates with the EPC network. The EPC network may include one or more SGWs 230, MMEs 235, and/or PGWs 240, and may enable user device 210 to communicate with network 290 and/or an Internet protocol (IP) multimedia subsystem (IMS) core network. The IMS core network may include HSS/AAA server 250 and may manage authentication, session initiation, account information, a user profile, etc. associated with user device 210.

User device 210 may include any computation and communication device, such as a wireless mobile communication device that is capable of communicating with base station 220 and/or network 290. For example, user device 210 may include a radiotelephone; a personal communications system (PCS) terminal (e.g., that may combine a cellular radiotelephone with data processing and data communications capabilities); a personal digital assistant (PDA) (e.g., that can include a radiotelephone, a pager, Internet/intranet access, etc.); a smart phone; a laptop computer; a tablet computer; a camera; a personal gaming system, or another type of mobile computation and communication device. User device 210 may send traffic to and/or receive traffic from network 290 via signal bearers, such as base station 220, SGW 230 and/or PGW 240. User device 210 may use an application to generate a security code and may use the security code to obtain a service from application server 270. User device 210 may, for example, provide the security code to application server 270 indirectly, via message server 260, as an out-of-band message. In one example, user device 210 may provide the security code via the out-of-band message based on a message protocol (e.g., an SMS MO protocol, a SS7 protocol, and/or some other message protocol). User device 210 may also, or alternatively, use a mechanism to encode the security code (e.g., using a hash function, a cryptographic hash function, an encryption function, and/or some other mathematical function). User device 210 may provide, to application server 270, a request for the service. The request may include the encoded security code and/or the identifier.

Base station 220 may include one or more network devices that receive, process, and/or transmit traffic, such as calls, audio, video, text, and/or other data, destined for and/or received from user device 210. In one example, base station 2 20 may be an eNB device and may be part of the LTE network. Additionally, or alternatively, one or more other base stations 220 may be associated with a RAN that is not associated with the LTE network (e.g., a wireless hot spot, a wireless access point, etc.). Base station 220 may receive traffic from and/or send traffic to network 290 via SGW 230 and PGW 240. Base station 220 may send traffic to and/or receive traffic from user device 210 via an air interface.

SGW 230 may include one or more network devices that gather, process, search, store, and/or provide information in a manner described herein. For example, SGW 230 may include a gateway, a router, a modem, a switch, a firewall, a network interface card (NIC), a hub, a bridge, a proxy server, an optical add-drop multiplexer (OADM), or some other type of device that processes and/or transfers traffic. SGW 230 may, for example, aggregate traffic received from one or more base stations 220 and may send the aggregated traffic to network 290 via PGW 240.

MME 235 may include one or more computation and communication devices that gather, process, search, store, and/or provide information in a manner described herein. For example, MME 235 may perform operations to register user device 210 with the EPS, to establish signal bearers associated with a session with user device 210, to handoff user device 210 from the EPS to another network, to handoff user device 210 from the other network to the EPS, and/or to perform other operations. MME 235 may perform policing operations on traffic destined for and/or received from user device 210.

PGW 240 may include one or more network devices, or other types of computation and communication devices, that gather, process, search, store, and/or provide information in a manner described herein. For example, PGW 240 may include a gateway, a router, a modem, a switch, a firewall, a NIC, a hub, a bridge, a proxy server, an OADM, or some other type of device that processes and/or transfers traffic. PGW 240 may aggregate traffic received from one or more SGWs 230, etc. and may send the aggregated traffic to network 290. PGW 240 may also, or alternatively, receive traffic from network 290 and may send the traffic toward user device 210 via SGW 230 and/or base station 220.

HSS/AAA server 250 may include one or more server devices, or other types of devices, that gather, process, search, store, and/or provide information in a manner described herein. For example, HSS/AAA server 250 may manage, update, and/or store, in a memory associated with HSS/AAA server 250, profile information associated with a subscriber. The profile information may identify applications and/or services that are permitted for and/or accessible by the subscriber; a MDN associated with the subscriber; bandwidth or data rate thresholds associated with the applications and/or services; information associated with the subscriber (e.g., a username, a password, a PIN, etc.); rate information; minutes allowed for a subscriber; and/or other information. The subscriber may be associated with user device 210 and/or one or more other user devices 210. Additionally, or alternatively, HSS/AAA server 250 may perform authentication, authorization, and/or accounting (AAA) operations associated with the subscriber and/or a communication session with user device 210.

Message server 260 may include one or more computation and communication devices that gather, process, search, store, and/or provide information in a manner described herein. In an example implementation, message server 260 may correspond to a short message service center (SMSC) server. Message server 260 may, for example, process out-of-band messages. In one example, message server 260 may receive, from user device 210 and via base station 220, an out-of-band message based on a message protocol (e.g., a SMS protocol, a SS7 protocol, or some other message protocol) that includes a security code and/or an identifier associated with a subscriber (e.g., a MDN and/or some other identifier). Message server 260 may forward the out-of-band message to application server 270. Message server 260 may, for example, forward the out-of-band message in a manner that prevents the out-of-band message from being routed to another network (e.g., via network 290) and/or accessed via another network. In one example, message server 260 may use a short code associated with application server 270 (e.g., that includes fewer characters or digits than a long code, such as a landline telephone number, an MDN, etc.), and/or some other format, to forward the out-of-band message.

Application server 270 may include one or more computation and communication devices that gather, process, search, store, and/or provide information in a manner described herein. Application server 270 may register user device 210 and may provide an application to user device 210 as a result of registering user device 210. In one example, application server 270 may communicate with HSS/AAA server 250 to authenticate user device 210 prior to registering user device 210. Additionally, or alternatively, application server 270 may, for example, receive an out-of-band message from message server 260 and may store an identifier and/or a security code in database 280. Application server 270 may receive, from user device 210 and via base station 220, a request to access a service. Application server 270 may obtain, from the request, an encoded security code and/or an identifier associated with the subscriber. Application server 270 may identify a decoding mechanism associated with the identifier and may use the decoding mechanism to decode the encoded security code. Application server 270 may use the identifier to perform a lookup operation, within database 280, to identify a stored security code. Application server 270 may authenticate the subscriber when the stored security code matches the decoded security code. When the subscriber is authenticated, application server 270 may provide the service to user device 210. Additionally, or alternatively, applications server 270 may provide an authentication service to service provider 285. For example, application server 270 may provide a notification, to service provider 285, that indicates whether the subscriber is authenticated when the service is to be provided, to user device 210, by service provider 285.

Database 280 may include one or more devices that store information used by application server 270 to perform operations described herein. Database 280 may, for example, store information used to authenticate subscribers, such as session identifiers that identify sessions associated with user devices 210, identifiers associated with subscribers (e.g., MDNs and/or other identifiers), security codes, etc. Database 280 may also, or alternatively, store a lookup table that associates a security code with an identifier for each of the sessions.

Service provider 285 may include one or more server devices, or other types of computation and communication devices, that provide content. For example, service provider 285 may host a website that can be accessed, by user device 210, to receive a service. The service may, for example, correspond to content (e.g., applications, web pages, video, audio, images, games, advertising content, text, data, and/or some combination thereof), a messaging service (e.g., email, instant message, etc.), a banking service, an electronic sales transaction service, etc. Service provider 285 may provide the content and/or service to user device 210 when application server 270 indicates that a subscriber, of user device 210, is authenticated.

Network 290 may include one or more wired and/or wireless networks. For example, network 290 may include a cellular network, a public land mobile network (PLMN), a second generation (2G) network, a third generation (3G) network, a fourth generation (4G) network, a fifth generation (5G) network, and/or another network. Additionally, or alternatively, network 290 may include a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks.

Figure 3:
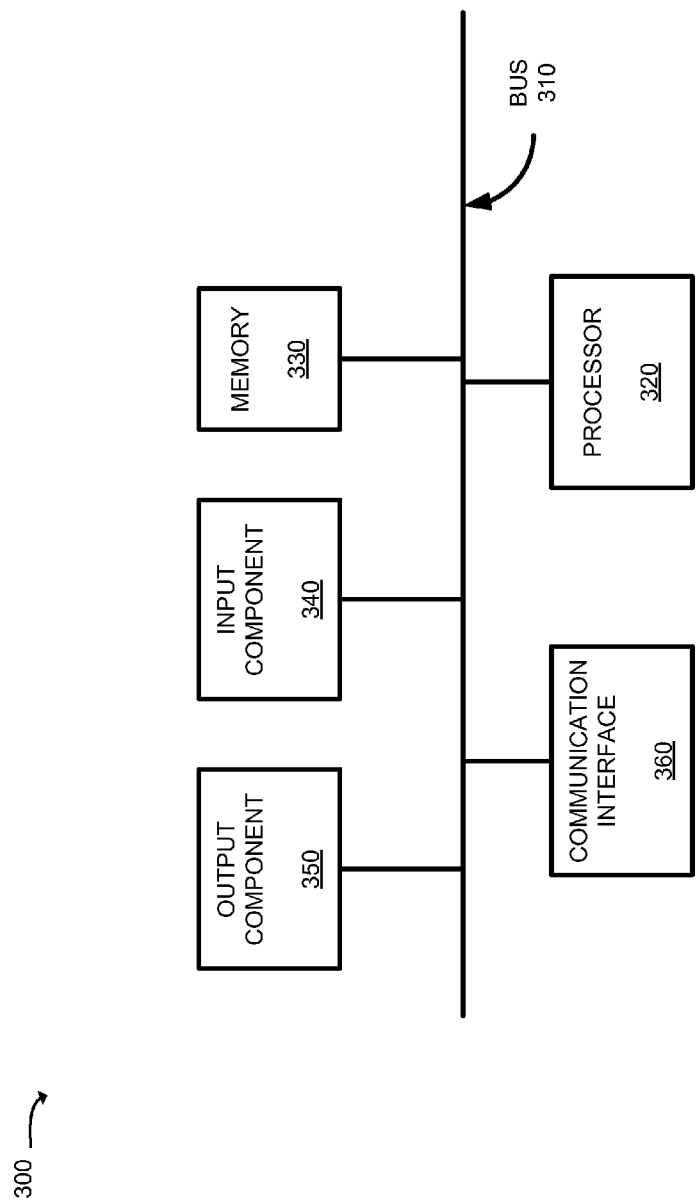
FIG. 3 is a diagram of example components of one or more devices of FIG. 2.

FIG. 3 is a diagram of example components of a device 300. Device 300 may correspond to user device 210, SGW 230, MME 235, PGW 240, HSS/AAA server 250, message server 260, application server 270, and/or service provider 285. Alternatively, or additionally, each of user device 210, SGW 230, MME 235, PGW 240, HSS/AAA server 250, message server 260, application server 270, and/or service provider 285 may include one or more devices 300 and/or one or more components of device 300.

Device 300 may include a bus 310, a processor 320, a memory 330, an input component 340, an output component 350, and a communication interface 360. Although FIG. 3 shows example components of device 300, in other implementations, device 300 may contain fewer components, additional components, different components, or differently arranged components than depicted in FIG. 3. For example, device 300 may include one or more switch fabrics instead of, or in addition to, bus 310. Additionally, or alternatively, one or more components of device 300 may perform one or more tasks described as being performed by one or more other components of device 300.

Bus 310 may include a path that permits communication among the components of device 300. Processor 320 may include a processor, a microprocessor, or processing logic that may interpret and execute instructions. Memory 330 may include any type of dynamic storage device that may store information and instructions, for execution by processor 320, and/or any type of non-volatile storage device that may store information for use by processor 320.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc. Communication interface 360 may include any transceiver-like mechanism that enables device 300 to communicate with other devices and/or systems via wireless communications, wired communications, or a combination of wireless and wired communications. For example, communication interface 360 may include mechanisms for communicating with another device or system via a network, such as network 290. Alternatively, or additionally, communication interface 360 may be a logical component that includes input and output ports, input and output systems, and/or other input and output components that facilitate the transmission of data to other devices.

Device 300 may perform certain operations in response to processing unit 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, s described herein are not limited to any specific combination of hardware circuitry and software.

Although FIG. 3 shows example components of device 300, in other implementations, device 300 may include fewer components, different components, differently arranged components, or additional components than depicted in FIG. 3. Alternatively, or additionally, one or more components of device 300 may perform one or more other tasks described as being performed by one or more other components of device 300.

Figure 4:
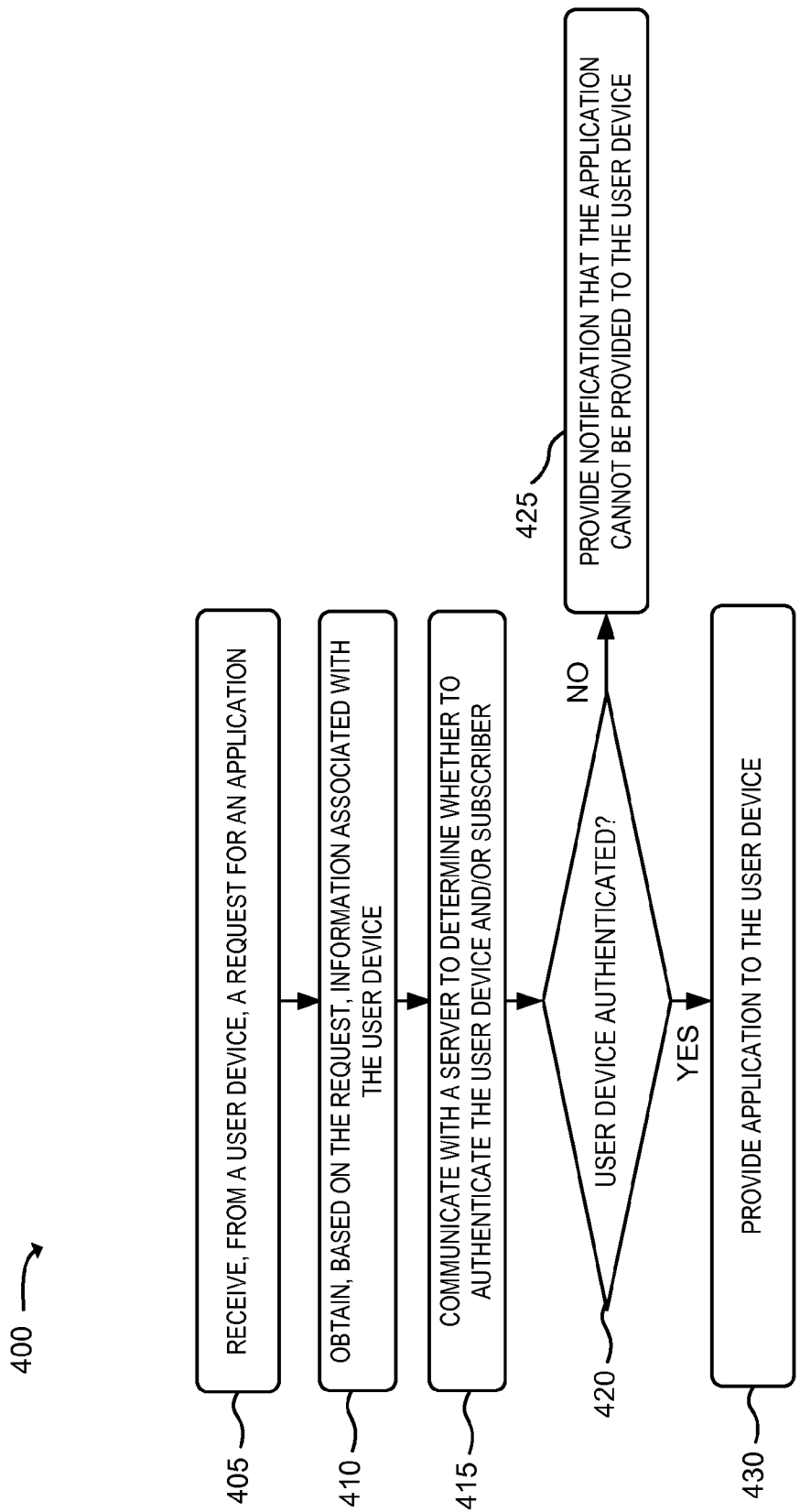
FIG. 4 is a flow chart of an example process for authenticating a user device based on a request for an application.

FIG. 4 is a flow chart of an example process 400 for authenticating user device 210 based on a request for a security application. In an example implementation, process 400 may be performed by application server 270. Additionally, or alternatively, some or all of process 400 may be performed by a device or collection of devices separate from, or in combination with, application server 270.

As shown in FIG. 4, process 400 may include receiving, from a user device, a request for a security application (block 405) and obtaining, based on the request, information associated with the user device (block 410). For example, a subscriber, associated with user device 210, may instruct user device 210 to obtain a security application that can be used to generate a security code that may be used to access services from a network. User device 210 may, based on the instruction, provide a request for the security application to application server 270.

Application server 270 may receive the request and may obtain, from the request, information associated with user device 210, such as a device identifier associated with user device 210 (e.g., an international mobile equipment identity (IMEI), an electronic serial number (ESN), a mobile equipment identifier (MEID), etc.); and/or an address (e.g., an Internet protocol (IP) address, a media access control (MAC) address, etc.). Additionally, or alternatively, application server 270 may obtain, from the request, information associated with the subscriber, such as a subscriber identifier (e.g., a MDN, a subscriber identity module (SIM) uniform resource identifier (URI), a mobile identification number (MIN), an international mobile subscriber identity (IMSI), a mobile subscriber integrated services digital network (MSISDN) identifier, a national access identifier (NAI), etc.), etc. In one example, application server 270 may communicate with user device 210 to obtain other information associated with the subscriber (e.g., a username, a password, a PIN, etc.).

As also shown in FIG. 4, process 400 may include communicating with a server device to determine whether to authenticate the user device and/or a subscriber (block 415). For example, application server 270 may communicate with HSS/AAA server 250 to authenticate user device 210 based on the information, associated with the user device 210, obtained from the request. Additionally, or alternatively, application server 270 may communicate with HSS/AAA server 250 to authenticate the subscriber based on the information associated with the subscriber and/or the other information associated with the subscriber.

HSS/AAA server 250 may determine whether to authenticate user device 210 based on whether the information associated with user device 210, matches information, associated with user device 210, stored within HSS/AAA server 250. Additionally, or alternatively, HSS/AAA server 250 may determine whether to authenticate the subscriber based on whether the information associated with the subscriber, received as a result of the communication, matches information associated with the subscriber stored within the memory.

As further shown in FIG. 4, if the user device is not authenticated (block 420—NO), process 400 may include providing a notification indicating that the application cannot be provided to the user device (block 425). For example, when the received information, associated with user device 210, does not match the stored information, associated with user device 210 (e.g., a received MAC address does not match a stored MAC address, etc.), HSS/AAA server 250 may not authenticate user device 210 and/or may provide, to application server 270, a notification indicating that user device 210 is not authenticated.

Additionally, or alternatively, when the received information, associated with the subscriber, does not match the stored information, associated with the subscriber (e.g., a received MDN does not match a stored MDN; a received password does not match a stored password; etc.), HSS/AAA server 250 may not authenticate the subscriber and/or may provide, to application server 270, a notification indicating that the subscriber is not authenticated.

When user device 210 and/or the subscriber are not authenticated, application server 270 may not provide the security application to user device 210. In one example, application server 270 may provide, to user device 210, a notification indicating that the security application cannot be provided to the user device 210. The notification may also, or alternatively, indicate that user device 210 and/or the subscriber are not authenticated.

As yet further shown in FIG. 4, if the user device is authenticated (block 420—YES), process 400 may include providing an application to the user device (block 430). For example, when the received information, associated with user device 210, matches the stored information, associated with user device 210, HSS/AAA server 250 may authenticate user device 210 and/or may provide, to application server 270, a notification indicating that user device 210 is authenticated.

Additionally, or alternatively, when the received information, associated with the subscriber, matches the stored information, associated with the subscriber, HSS/AAA server 250 may authenticate the subscriber and/or may provide, to application server 270, a notification indicating that the subscriber is authenticated.

When user device 210 and the subscriber are authenticated, application server 270 may provide the security application to user device 210. The security application may, for example, include a mechanism that can be used, by user device 210, to generate a security code. The security application may also, or alternatively, include an encoding mechanism that can be used to encode the security code. The security mechanism may, for example, correspond to a hash function, a cryptographic hash function, an encryption function, and/or some other mathematical function that can be used to encode the security code. Additionally, or alternatively, the security mechanism may include a shared key. The shared key may be used, by user device 210, to encode the security code. Application server 270 may store a copy of the shared key that can be used to decode an encoded security code received from user device 210.

User device 210 may receive the security application and may store the security application on user device 210. Alternatively, or additionally, user device 210 may provide the security application for display to the subscriber.

Figure 5:
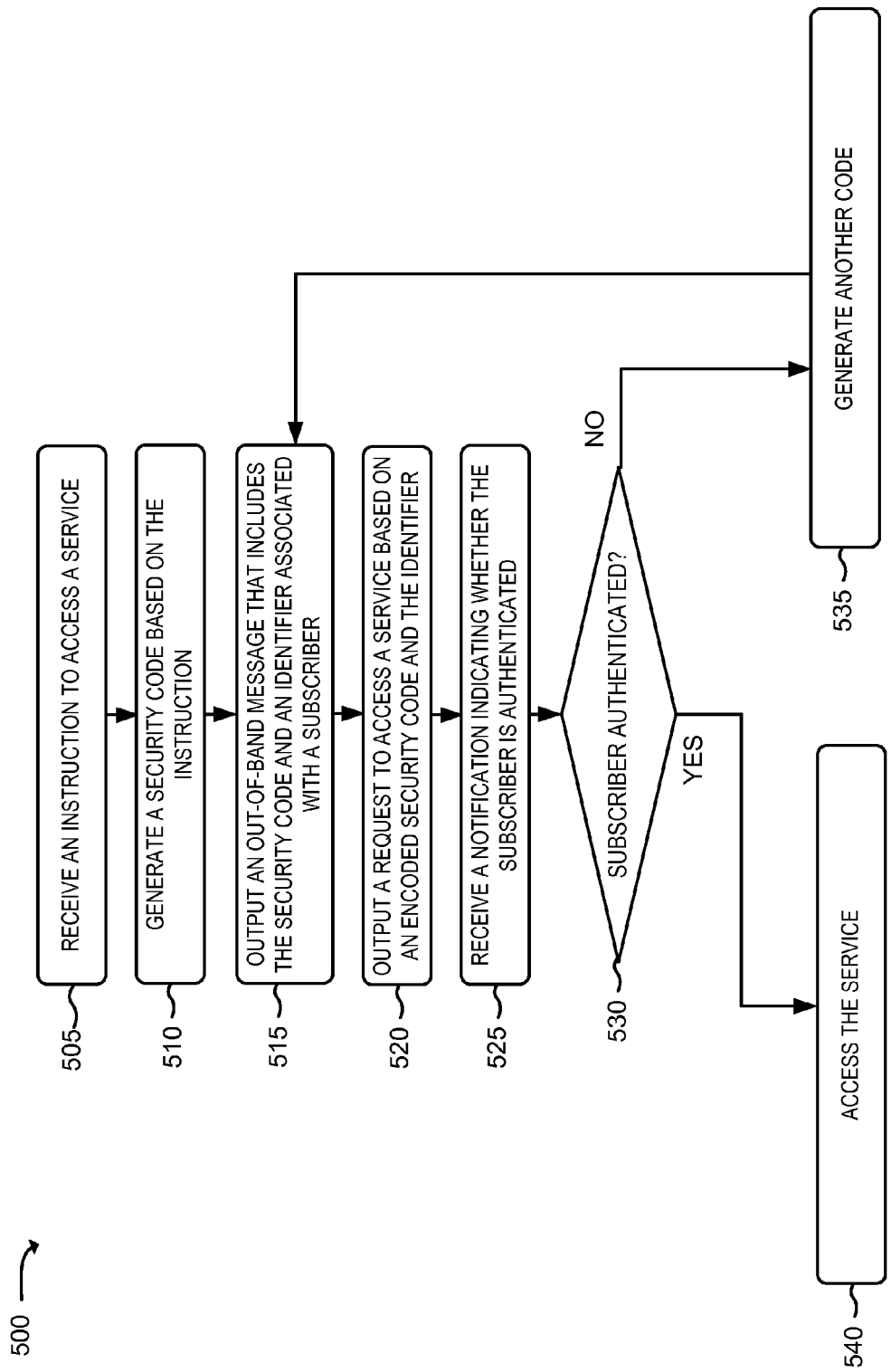
FIG. 5 is a flow chart of an example process for authenticating a subscriber based on a security code generated by a user device.

FIG. 5 is a flow chart of an example process 500 for authenticating a subscriber, based on a security code generated by a user device. In one example implementation, process 500 may be performed by user device 210. Additionally, or alternatively, some or all of process 500 may be performed by a device or collection of devices separate from, or in combination with, user device 210.

As shown in FIG. 5, process 500 may include receiving an instruction to access a service (block 505) and generating a security code based on the instruction (block 510). For example, a subscriber may desire to access a service and may cause user device 210 to power up. User device 210 may, as a result of powering up, automatically execute a security application, previously received from application server 270 in a manner similar to that described above in FIG. 4, to generate a security code.

Additionally, or alternatively, the subscriber may cause user device 210 to open application, hosted by user device 210, that is to be used to access the service (e.g., a browser, an email application, a game, a social networking application, etc.). Opening the application may cause user device 210 to automatically execute the security application to generate the security code. Additionally, or alternatively, the subscriber may manually cause the security code to be generated by selecting an icon, associated with the security application, being displayed on user device 210. Selecting the icon may cause user device 210 to open the security application and to execute the security application to generate the security code.

The security code may be generated in a number of ways. In one example, the security application, when executed, may generate a random value on which the security code is based. Additionally, or alternatively, the security application may use a mechanism (e.g., a hash function and/or some other mathematical function) to encode the random value and the encoded random value may be the security code. Additionally, or alternatively, the security application may use the mechanism to generate the security code based on the random value and an identifier associated with the subscriber (e.g., MDN, etc.).

Additionally, or alternatively, the security application may store the security code in a memory associated with user device 210. In one example, the security application may store the security code in a manner that cannot be accessed by the subscriber and/or other applications that are stored on user device 210. Additionally, or alternatively, the security application may encode the security code (e.g., using a cryptographic hash function, an encryption function, a hash function, and/or some other mathematical function) in a manner that precludes the security code from being obtained except by the security application.

As also shown in FIG. 5, process 500 may include outputting an out-of-band message that includes the security code and an identifier associated with a subscriber (block 515). For example, user device 210 may obtain an identifier, associated with the subscriber, such as the MDN and/or some other identifier. In the description below, the identifier is described as being a MDN for explanatory purposes. In another implementation, another identifier, other than the MDN, may be used, such as, for example, a SIM URI, a MIN, an IMSI, a MSISDN identifier, a NAI, etc.

User device 210 may output a message, to message server 260, that includes the security code and the MDN. In one example, user device 210 may output the message as an out-of-band message based on a message protocol (e.g., an SMS MO protocol, a SS7 protocol, etc.). Message server 260 may receive the message and may provide the message to application server 270. In one example, message server 260 may use a short code associated with application server 270 and/or some other format, to forward the out-of-band message to application server 270. Application server 270 may receive the out-of-band message and may, in a manner to be described in greater detail below with respect to FIG. 7, store the security code and/or the MDN in a data structure (e.g., data structure 700 of FIG. 7) within database 280.

As further shown in FIG. 5, process 500 may include outputting a request to access the service based on the security code and the identifier (block 520) and receiving a notification indicating whether the subscriber is authenticated to access the service (block 525). For example, user device 210 may, as a result of outputting the out-of-band message, use the security application to encode the security code. The security application may, for example, use an encoding mechanism (e.g., a hash function, a cryptographic hash function, an encryption function, and/or some other mathematical function) and/or a copy of a key to encode the security code. User device 210 may also, or alternatively, provide a request, to application server 270, to access a service. The request may include the encoded security code and/or the MDN, and/or may identify the service to be accessed (e.g., from service provider 285, application server 270, or some other server). In one example, the request may be provided using a protocol (e.g., HTTP, SMPP, SIP, etc.). Application server 270 may receive the request and may, in a manner that is described in greater detail below with respect to FIG. 7, perform an authentication operation on the subscriber based on the encoded security code and/or MDN received in the request and/or the security code and/or MDN stored in database 280. Authentication server 270 may, based on the authentication operation, provide a notification, to user device 210, that indicates whether the subscriber is authenticated for use of the service.

As yet further shown in FIG. 5, if access is not granted (block 530—NO), process 500 may include generating another security code (block 535). For example, user device 210 may receive, from application server 270, a notification that indicates whether the subscriber is authenticated. When the notification indicates that the subscriber is not authenticated, user device 210 may not access the service. Additionally, or alternatively, user device 210 may execute the security application to generate another security code. User device 210 may also, or alternatively, use the other security code to authenticate the subscriber in a manner similar to that described above with respect to blocks 515-525.

As still further shown in FIG. 5, if access is granted (block 530—YES), process 500 may include accessing the service (block 540). For example, user device 210 may receive, from application server 270, a notification that indicates that the subscriber is authenticated. In one example, application server 270 may provide the service to user device 210 when the subscriber is authenticated. Additionally, or alternatively, application server 270 may provide a notification, to service provider 285, indicating that the subscriber is authenticated. Service provider 285 may receive the notification and may provide the service to user device 210.

Figure 6:
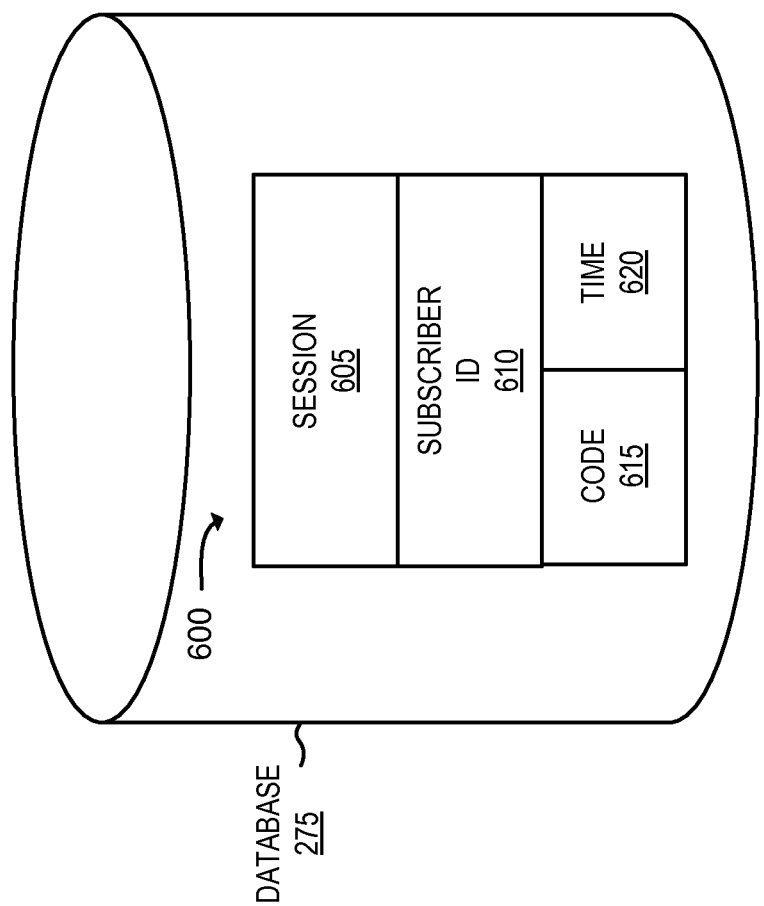
FIG. 6 is a diagram of an example data structure that stores authentication information associated with a subscriber.

FIG. 6 is a diagram of an example data structure 600 that stores authentication information associated with a subscriber. Data structure 600 may be stored in database 280. As illustrated in FIG. 6, data structure 600 may include a collection of fields, such as a session field 605, a subscriber identifier (ID) field 610, a code field 615, and a time field 620. Fields 605-620, within data structure 600, are provided for explanatory purposes. Additionally, or alternatively, there may be additional fields, fewer fields, different fields, or differently arranged fields than are shown in FIG. 6.

Session field 605 may store information that identifies a session associated with user device 210. For example, application server 270 may receive an out-of-band message, in a manner similar to that described above with respect to block 515 (FIG. 5), and may generate a session identifier, associated with a particular session, with user device 210. Additionally, or alternatively, application server 270 may obtain a session identifier from the out-of-band message, and may store the session identifier in session field 605.

Subscriber ID field 610 may store a subscriber identifier (e.g., a MDN and/or some other subscriber identifier) associated with a subscriber. For example, application server 270 may, in a manner similar to that described above with respect to block 515 (FIG. 5), obtain, from the out-of-band message associated with the particular session, a subscriber identifier (e.g., MDN, etc.) and may store the subscriber identifier in subscriber ID field 610.

Code field 615 may store a security code associated with the particular session. For example, application server 270 may, in a manner similar to that described above with respect to block 515 (FIG. 5), obtain, from the out-of-band message associated with the particular session, a security code. Application server 270 may store the security code in code field 615.

Time field 620 may store information that identifies a time when the out-of-band message was received and/or a time when the security code is to expire. For example, application server 270 may determine a time when the out-of-band message was received and may store information that identifies the time in time field 620. Application server 270 may also, or alternatively, determine a future time, relative to the time when the out-of-band message was received, when the security code is to expire. Application server 270 may also, or alternatively, store information that identifies the future time in time field 620. Application server 270 may store, in data structure 600, other authentication information for each session being processed by authentication server 270.

Figure 7:
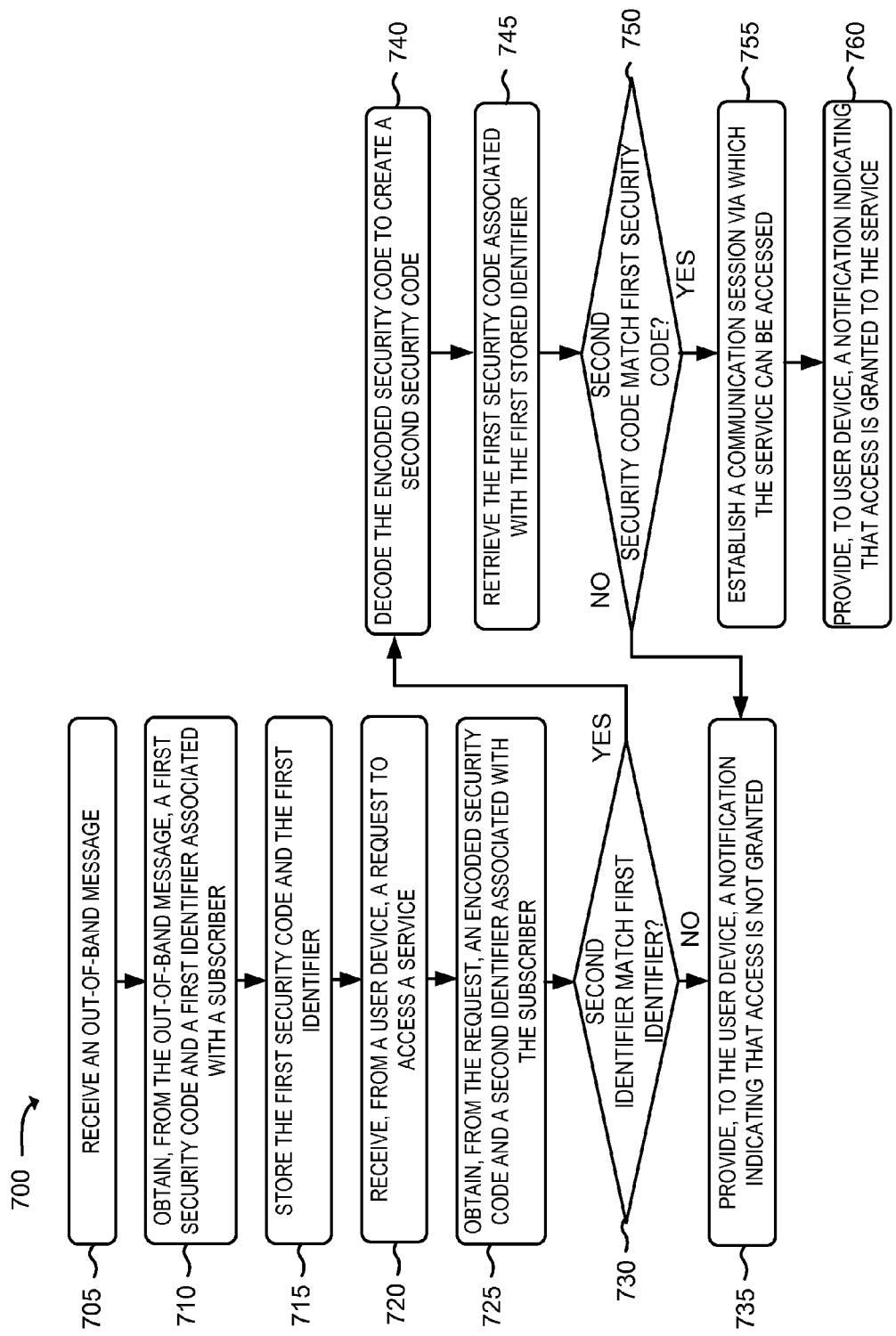
FIG. 7 is a flow chart of an example process for authenticating a subscriber, using a security code, in response to a request to access a service.
Figure 8:
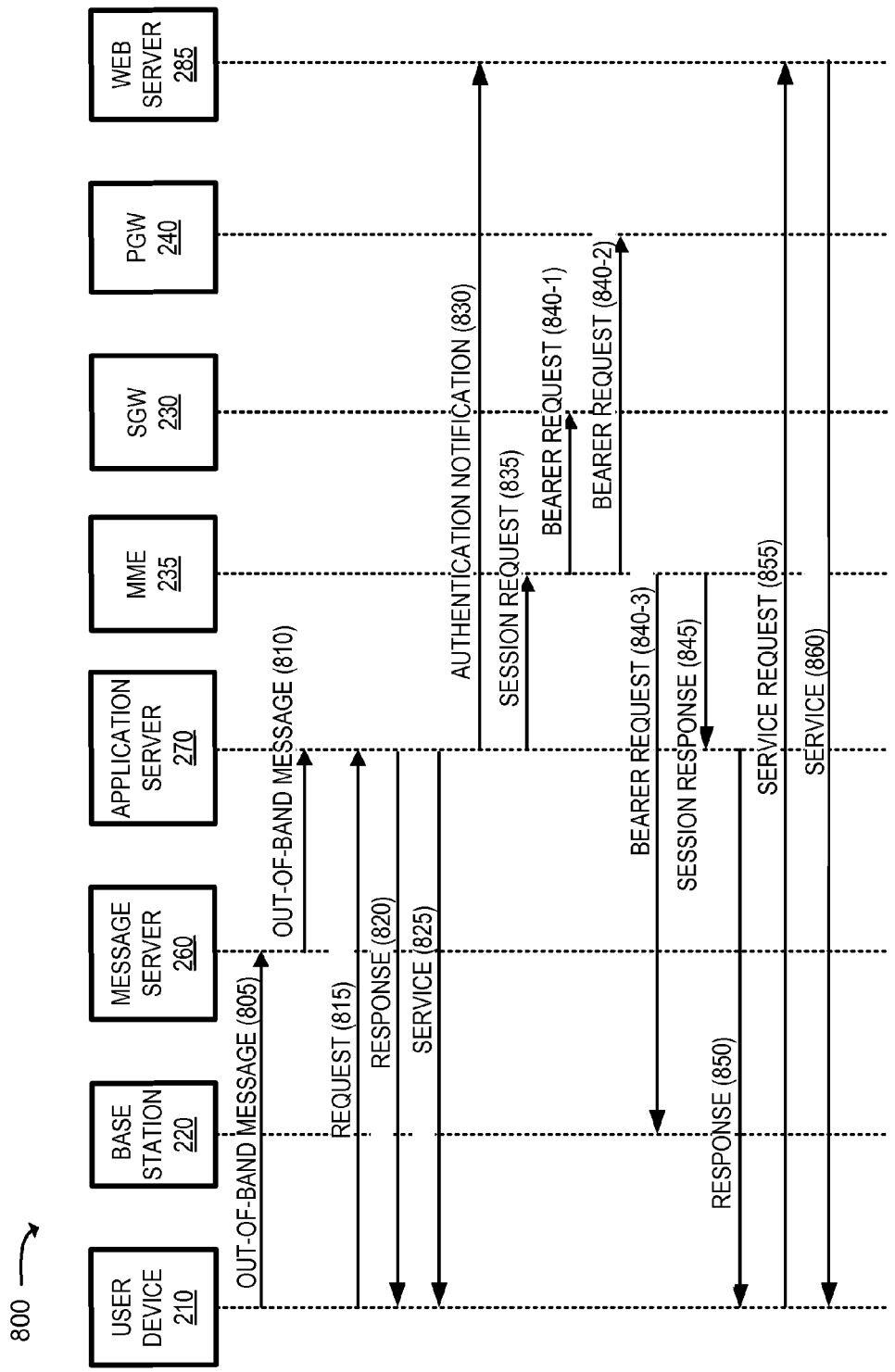
FIG. 8 is a diagram of an example signal flow between devices of an example portion of the environment of FIG. 2.

FIG. 7 is a flow chart of an example process 700 for authenticating a subscriber, using a security code, in response to a request to access a service. In one example implementation, process 700 may be performed by application server 270. Additionally, or alternatively, some or all of process 700 may be performed by a device or collection of devices separate from, or in combination with, application server 270. FIG. 8 is a diagram of an example signal flow between devices of an example portion 800 of environment 200. As illustrated in FIG. 8, example portion 800 may include user device 210, base station 220, SGW 230, PGW 240, message server 260, application server 270, and service provider 285. User device 210, base station 220, SGW 230, PGW 240, message server 260, application server 270, and service provider 285 may include the features described above in connection with one or more of FIGS. 2-4. In the description below, a portion process 700 of FIG. 7 will be described with references to example portion 800 of FIG. 8.

As shown in FIG. 7, process 700 may include receiving an out-of-band message (block 705). Assume that user device 210 receives an instruction to access a service. Assume also, that user device 210, in response to the instruction, uses a security application, provided in user device 210, to generate a first security code in a manner similar to that described above with respect to block 510 (FIG. 5). User device 210 may provide an out-of-band message 805 (FIG. 8) to message server 260 that includes the first security code and a first identifier, associated with the subscriber (e.g., a MDN). In one example, user device 210 may provide out-of-band message 805 using a message protocol (e.g., an SMS MO protocol, an SS7 protocol, etc.). Message server 260 may receive out-of-band message 805 and may provide out-of-band message 810 (FIG. 8) to application server 270. In one example, message server 260 may provide out-of-band message 810 using the message protocol and/or some other message protocol. Additionally, or alternatively, message server 260 may use a short code, associated with application server 270, to provide out-of-band message 810 to application server 270. Application server 270 may receive out-of-band message 810.

As also shown in FIG. 7, process 700 may include obtaining, from the out-of-band message, a first security code and a first identifier associated with a subscriber (block 710) and storing the first security code and the first identifier (block 715). For example, application server 270 may obtain, from out-of-band message 810, the first security code and the first identifier. Application server 270 may also, or alternatively, identify a time at which out-of-band message 810 was received and may associate a session identifier with out-of-band message 810. Application server 270 may also, or alternatively, store the session identifier, the first identifier, the first security code, and/or the identified time in a data structure (e.g., data structure 600 of FIG. 6).

As further shown in FIG. 7, process 700 may include receiving, from a user device, a request to access a service (block 720) and obtaining, from the request, a second encoded security code and a second identifier associated with the subscriber (block 725). Assume that user device 210 generates an encoded security code and provides a request 815 (FIG. 8) to application server 270 in a manner similar to that described above with respect to block 620 of FIG. 6. Request 815 may, in one example, identify a service that is to be obtained from application server 270. Request 815 may also, or alternatively, identify a service that is to be obtained from service provider 285. In this example, request 815 may include information that identifies service provider 285, such as an address associated with service provider 285 (e.g., an IP address, a uniform resource locator (URL), etc.) Request 815 may include a second identifier associated with the subscriber and/or the encoded security code. Application server 270 may receive request 815 and may obtain, from request 815, the encoded security code and/or the second identifier.

As yet further shown in FIG. 7, if the second identifier does not match the first identifier (block 730—NO), process 700 may include providing, to the user device, a notification indicating that access is not granted for the service (block 735). For example, application server 270 may access database 280 to determine whether the second identifier matches an identifier that is stored in database 280. When the second identifier does not match the first identifier and/or any of other identifiers stored within database 280, application server 270 may provide, to user device 210, a response 820 (FIG. 8) indicating that the subscriber could not be authenticated and/or that user device 210 cannot access the service.

As still further shown in FIG. 7, if the second identifier matches the first identifier (block 730—YES), process 700 may include decoding the encoded security code to create a second security code (block 740) and retrieving the first security code associated with the first identifier (block 745). For example, application server 270 may obtain a decoding mechanism that corresponds to the second identifier received via request 815 (FIG. 8). Application server 270 may use the decoding mechanism to decode the encoded security code to create a second security code. In one example, the decoding mechanism may include a key that corresponds to a key that is used, by user device 210, to generate the encoded security code.

Application server 270 may also, or alternatively, access database 280 and may determine that the second identifier matches the first identifier that is stored in database 280. When the second identifier matches the first identifier, application server 270 may retrieve, from the data structure, the first security code associated with the first identifier.

As also shown in FIG. 7, if the second security code does not match the first security code (block 750—NO), process 700 may include providing, to the user device, the notification indicating that access is not granted for the service (block 735). For example, application server 270 may determine whether the second security code matches the first security code. When the second security code does not match the first security code, application server 270 may not authenticate the subscriber.

Additionally, or alternatively, application server 270 may determine whether the first security code, retrieved from database 280, has expired based on information, retrieved from database 280, that identifies a time that the first security code expires. Application server 270 may determine that a current time is after the time that the first security code expires. Based on the determination that the first security code has expired, application server 270 may not authenticate the subscriber. When the second security code does not match the first security code and/or when the first security code has expired, application server 270 may provide, to user device 210, response 820 indicating that the subscriber could not be authenticated and/or that user device 210 cannot access the service.

As further shown in FIG. 7, if the second security code matches the first security code (block 750—YES), process 700 may include establishing a communication session via which the service can be accessed (block 755) and providing, to the user device, a notification indicating that access is granted to the service (block 755). For example, application server 270 may determine that the second security code matches the first security code. When the second security code matches the first security code, application server 270 may authenticate the subscriber. When the subscriber is authenticated, application server 270 may, in one example, provide a service 825 (FIG. 8) to user device 210.

Additionally, or alternatively, when the service is to be obtained from service provider 285, application server 270 may provide an authentication service to service provider 285 that indicates whether the subscriber is authenticated. In this example, when the subscriber is authenticated, application server 270 may provide an authentication notification 830 (FIG. 8), to service provider 285, that indicates that the subscriber is authenticated.

Additionally, or alternatively, when the subscriber is authenticated, application server 270 may cause a session to be established that enables user device 210 to communicate with service provider 285, via network 290, to access the service. For example, application server 270 may provide a session request 835 (FIG. 8) to MME 235 requesting to establish a session to enable user device 210 to access the service from service provider 285. MME 235 may receive session request 835 and may provide a set of bearer requests 840-1-840-3 to signal bearer devices, such as SGW 230, PGW 240, and/or base station 220, respectively. Bearer requests 840 may cause the signal bearer devices to set up a communication session that enables user device 210 to communicate with service provider 285 via network 290. MME 235 may, based on establishing the session, provide a session response 845 (FIG. 8) to application server 270 indicating that the session has been established.

Application server 270 may receive session response 845 and may provide, to user device 210, a response 850 (FIG. 8) indicating that the subscriber is authenticated and/or that the service can be obtained from service provider 285. User device 210 may receive response 850 and may provide, to service provider 285 and via the signal bearer devices, service request 855 (FIG. 8). Service request 855 may include information that identifies the subscriber (e.g., the MDN, etc.) and/or the service to be obtained by user device 210. Service provider 270 may receive service request 855 and may, based on authentication notification 830 that indicates that the subscriber is authenticated, provide a service 860 (FIG. 8) to user device 210.

Systems and/or methods, described herein, may enable a server device, such as an application server, to authenticate a subscriber based on a security code that is generated by a user device. The user device may generate the security code and may provide the security code to the application server via an out-of-band message. The user device may also, or alternatively, provide, to the application server, a request (e.g., for a service) that includes an encoded version of the security code. Providing the security code, to the application server, via the out-of-band message and the encoded version of the security code via the request, may enable the application server to authenticate the subscriber for use of the service based on the security code and the encoded version of the security code.

The foregoing description provides illustration and description, but is not intended to be exhaustive or to limit the implementations to the precise form disclosed. Modifications and variations are possible in light of the above disclosure or may be acquired from practice of the embodiments.

While series of blocks have been described with regard to FIGS. 4, 5 and 7, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an application specific integrated circuit (ASIC), or a field programmable gate array (FPGA), or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the embodiments unless explicitly described as such. Also, as used herein, the articles "a" and "an" are intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A user device comprising:
   one or more processors to:
      receive an indication that a security code is to be generated,
      generate the security code based on the indication,
      generate a message that includes the security code and an identifier associated with a subscriber of the user device,
      output the message, using a first protocol, to a server device from which access to the service is to be obtained,
      encode the security code,
      output a request to access the service to the server device,
         the request being separate from the message,
         the request being outputted using a second protocol, and
         the request including the encoded security code and the identifier,
      receive a notification that indicates whether the subscriber is authenticated based on the identifier included in the message and included in the request, the security code included in the message, and the encoded security code included in the request, and
      access the service when the notification indicates that the subscriber is authenticated.

2. The user device of claim 1, where the one or more processors are further to:
   generate a random value, and
   generate, using a first mechanism, the security code based on at least one of:
      the random value,
      the identifier, or
      a combination of the random value and the identifier.

3. The user device of claim 2, further comprising:
   generate, using a second mechanism, the encoded security code based on the security code, the second mechanism corresponding to at least one of:
      a hash function,
      a cryptographic hash function, or
      an encryption function.

4. The user device of claim 1, where the server device from which access to the service is to be obtained is a first server device, and
   where, when outputting the message using the first protocol, the one or more processors are further to:
      output, using the first protocol, the message to a second server device,
         outputting the message to the second server device enabling the message to be provided to the first server device from which access to the service is to be obtained.

5. The user device of claim 4, where, when outputting the request using the second protocol, the one or more processors are further to:
   output, using the second protocol, the request to the first server device,
      outputting the request to the first server device enabling the first server device to determine whether to authenticate the subscriber based on the security code included in the message and the encoded security code included in the request.

6. The user device of claim 1, where the one or more processors are further to:
   receive an instruction to access another service,
   retrieve the security code from a memory, associated with the user device, based on the instruction,
   encode the security code to create the encoded security code, and
   output another request for the other service, the other request including the encoded security code and the identifier.

7. The user device of claim 1, where the one or more processors are further to:
   receive a notification indicating that the subscriber is not authenticated,
   generate a different security code based on the notification indicating that the subscriber is not authenticated.

8. The user device of claim 1, where the one or more processors are further to:
output, using the first protocol, a different message including the identifier and a different security code,
encode the different security code to create a different encoded security code,
output, using the second protocol, a different request to access the service,
the different request including the different encoded security code and the identifier,
receive a different notification that indicates that the subscriber is authenticated based on the identifier, the different security code, and the different encoded security code, and
access the service based on the different notification indicating that the subscriber is authenticated.

9. The user device of claim 1, where the first protocol is different than the second protocol, the first protocol corresponding to at least one of:
an instant message protocol;
a short message service (SMS) protocol, or
a signal systems seven (SS7) protocol; and
where the second protocol corresponds to at least one of:
a hypertext transfer protocol (HTTP),
a short message peer-to-peer (SMPP) protocol, or
a session initiation protocol (SIP).

10. A server device, comprising:
one or more processors to:
receive messages, via a first protocol, that include first identifiers and first codes,
the first identifiers corresponding to subscribers,
receive, from a user device and via a second protocol, a request to access a service,
the request being separate from the messages,
the request including a second identifier and a second code,
the second identifier corresponding to a subscriber, of the subscribers,
determine whether the second identifier, included in the request, matches a first identifier, of the first identifiers, that is included in a message, of the messages,
decode the second code to create a third code,
identify a first code, of the first codes, included in the message when the second identifier matches the first identifier,
determine whether the third code matches the first code,
authenticate the subscriber when the third code matches the first code, and
provide, to the user device, an indication that the user device is authorized to access the service based on authenticating the subscriber.

11. The server device of claim 10, where, when receiving the messages, the one or more processors are further to:
receive, from the user device and via a particular server device, a first message, of the messages, the first message being based on the first protocol,
obtain, from the first message, the first identifier and the first code, and
store the first identifier and the first code in a memory associated with the server device.

12. The server device of claim 10, where the first protocol corresponds to at least one of:
a short message service (SMS) protocol,
a signal systems seven (SS7) protocol, or
an instant message protocol.

13. The server device of claim 10, where the one or more processors are further to:
determine that the subscriber is not authenticated when the second identifier does not match the first identifier, and
provide, to the user device, an indication that the user device is not authorized to access the service based on the determination that the subscriber is not authenticated.

14. The server device of claim 10, where the one or more processors are further to:
determine that the subscriber is not authenticated when the third code does not match the first code, and
provide, to the user device, an indication that the user device is not authorized to access the service based on the determination that the subscriber is not authenticated.

15. The server device of claim 10, where the one or more processors are further to:
determine that the subscriber is not authenticated when the first code has expired, and
provide, to the user device, an indication indicating that the user device is not authorized to access the service based on the determination that the first code has expired.

16. The server device of claim 10, where, when determining whether the second identifier matches the first identifier, the one or more processors are further to:
access a memory, associated with the server device, to perform a lookup operation, the memory storing the first identifier and the first codes,
determine, based on the lookup operation, that the second identifier matches the first identifier of the stored first identifiers, and
retrieve, from the memory, the first code that corresponds to the first identifier.

17. A method comprising:
receiving, by a user device, an indication that a first code is to be generated;
generating, by the user device, the first code based on the indication;
obtaining, by the user device, an identifier associated with a subscriber;
providing, by the user device, the first code and the identifier to a first server device using a first protocol,
the first server device providing a service, based on the first protocol, that enables the code and the identifier to be provided to a second server device;
generating, by the user device and using a mechanism, a second code after providing the first code and the identifier to the first server device,
the mechanism enabling the user device to encode the first code to create the second code;
providing, by the user device and to the second server device, the second code and the identifier,
the second code and the identifier being provided to the second server device using a second protocol that is different than the first protocol;
receiving, by the user device and from the second server device, a notification that indicates whether the subscriber is authenticated based on the identifier provided using the first protocol and provided using second protocol, the first code provided using the first protocol, and the second code provided using the second protocol; and
accessing, by the user device, the service when the notification indicates that the subscriber is authenticated.

18. The method of claim 17, where the second code is encoded in a manner that does not permit the first code to be used, by a different user device, to access the service.

19. The method of claim 17, further comprising:
receiving an instruction to access the service;

retrieving, from the memory, the first code based on the instruction;

encoding the first code to create the second code; and providing, to the second server device, the second code and the identifier based on encoding the first code to create the second code.

20. The method of claim 17, further comprising:

receiving a notification that indicates that the subscriber is not authenticated;

generating a third code based on the notification that the subscriber is not authenticated;

providing the third code and the identifier to the first server device based on the first protocol;

generating, using the mechanism, a fourth code based on the third code;

providing, to the second server device and using the second protocol, the fourth code and the identifier after providing the third code and the identifier to the first server device;

receiving, from the second server device, a notification that indicates that the subscriber is authenticated based on the third code, the fourth code, and the identifier; and accessing the service when the notification indicates that the subscriber is authenticated.

* * * * *